Sept. 1, 1970  S. S. CAUDILL  3,526,290

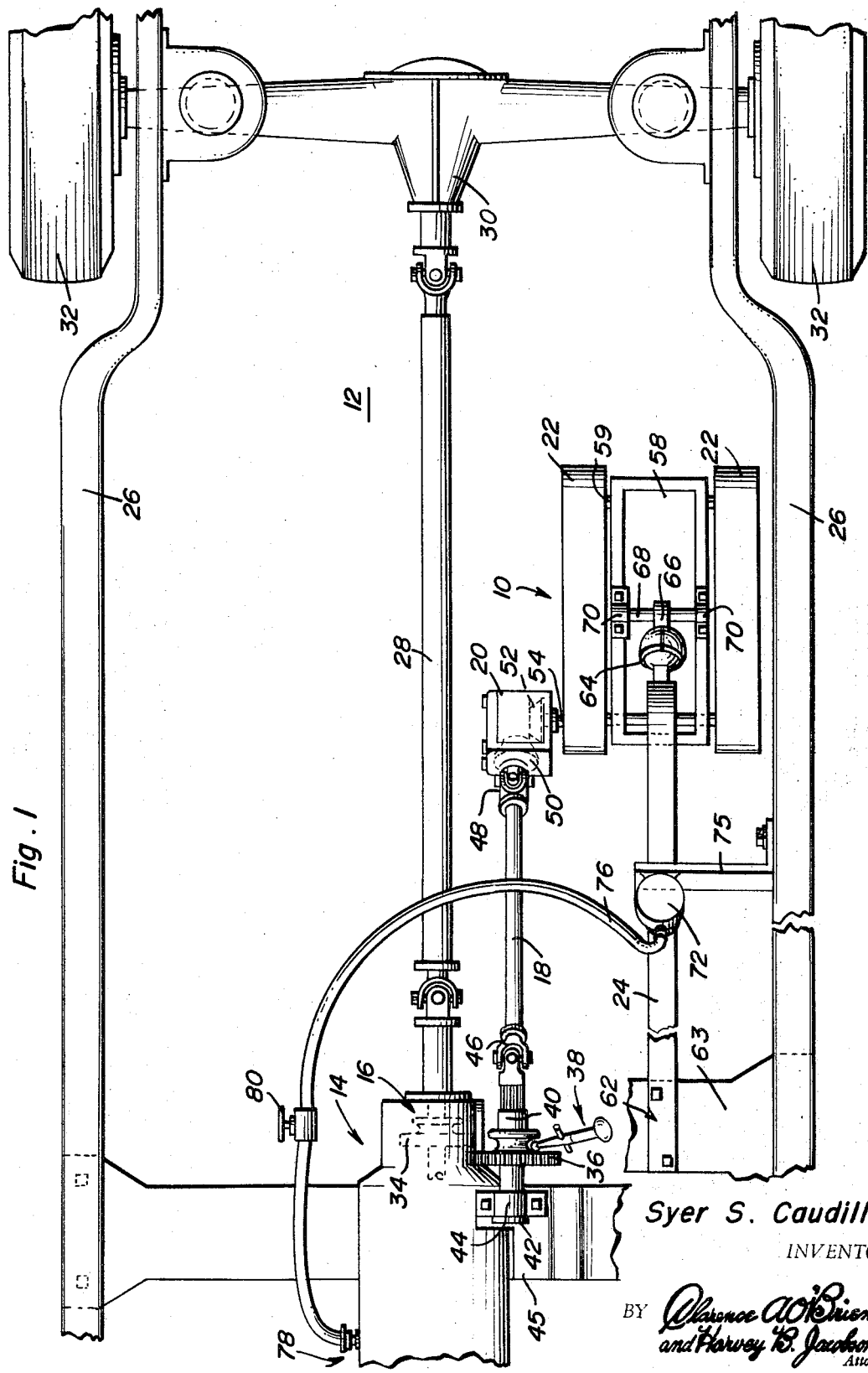

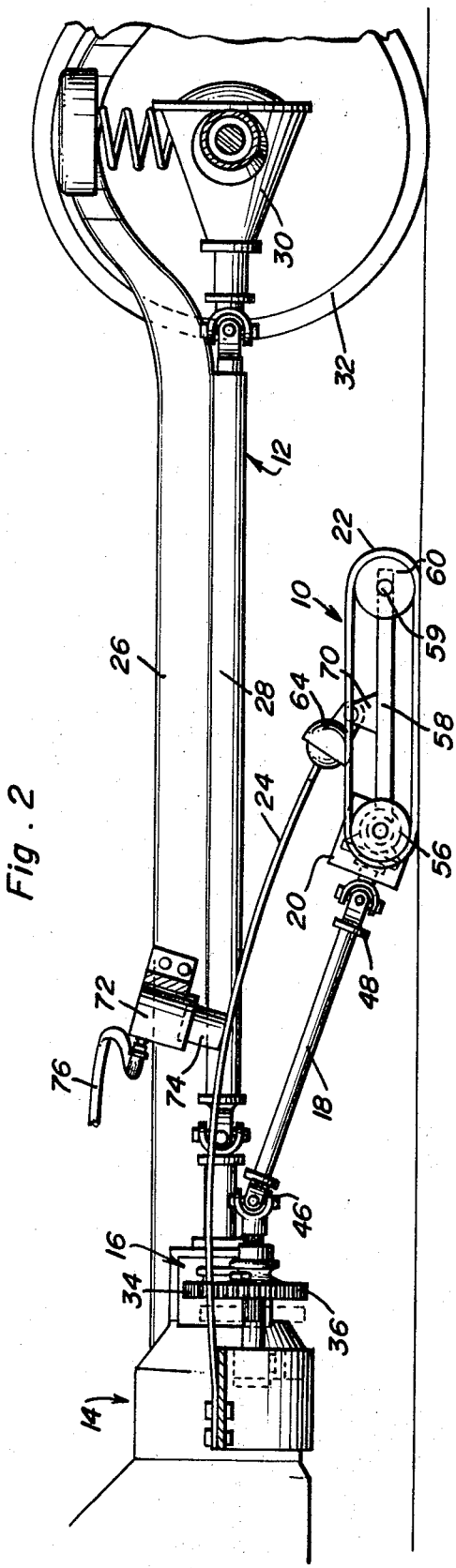
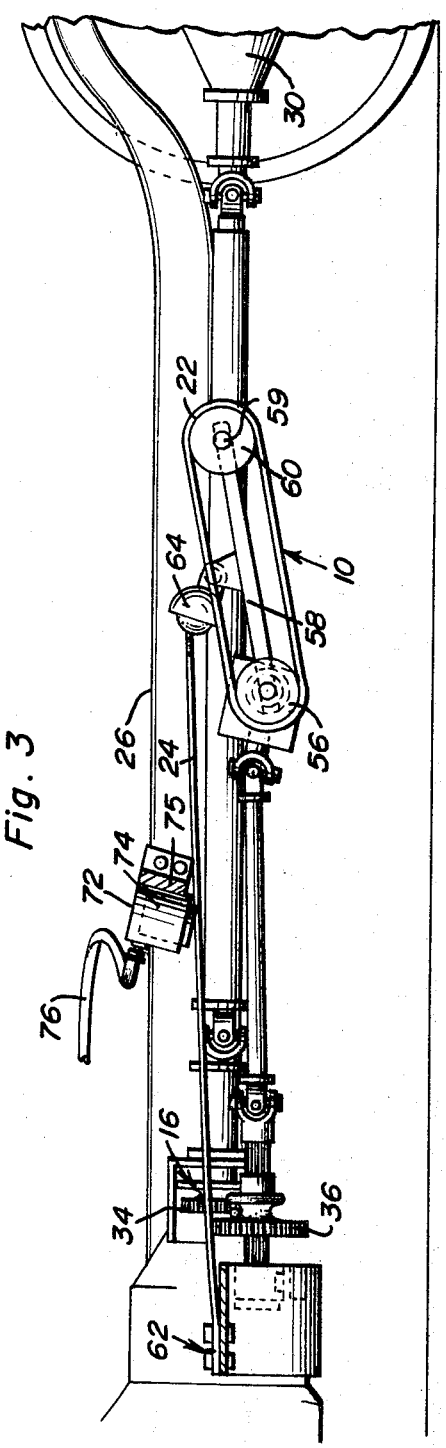

TRACTION DEVICE FOR VEHICLES

Filed April 23, 1968  3 Sheets-Sheet 3

Syer S. Caudill
INVENTOR.

BY *Clarence A. O'Brien*
*and Harvey B. Jackson*
Attorneys

United States Patent Office 3,526,290
Patented Sept. 1, 1970

1

3,526,290
TRACTION DEVICE FOR VEHICLES
Syer S. Caudill, Roanoke, Va., assignor of five percent to George W. Draper, Salem, Va.
Filed Apr. 23, 1968, Ser. No. 723,382
Int. Cl. B60k 25/06; B60b 15/00
U.S. Cl. 180—15                                                6 Claims

ABSTRACT OF THE DISCLOSURE

A pivotal drive shaft is mounted coaxially with a rotary gear which selectably engages the power take-off gear of a vehicle transmission. The drive shaft is linked to an endless traction belt device for rotational actuation thereof. A leaf spring assembly is attached at one end thereof to the vehicle frame while the opposite leaf spring end is attached to the belt device. Thus, the leaf spring assembly provides means for delivering thrust to the vehicle during operation of the belt device. Hydraulic means are provided for lowering the endless belt device to the ground when traction thrust is required. When starting speed is developed by the vehicle, means are actuated for retracting and ceasing operation of the endless belt device.

---

The present invention relates to traction devices, more particularly to a retractable endless belt traction device for vehicles.

The prior art has included a number of auxiliary traction devices for assisting vehicles to generate starting speed when road conditions are slippery and prevent proper traction by the wheels of the vehicle. These prior constructions have included traction members driven by pulley means which leave something to be desired due to the slippage thereof. Further, certain devices include a manually operated hydraulic engagement and disengagement control for the traction member proper which requires the attention and efforts of the driver thereby adding to the inconvenience of getting his vehicle moving.

The present invention includes a traction member mounted to a vehicle frame by means of a thrust delivering leaf spring normally biasing the traction member in a retracted or upward position. Hydraulic means are connected to the automatic transmission of a vehicle for automatically lowering the traction device during low speed operation thereof. A selectable clutch arrangement provides means for engaging a drive shaft of the traction member which causes rotation thereof. Thus, as will be appreciated, the present invention offers the novel and useful advantage of lowering the traction member in automatic response to low speed vehicle operation. The leaf spring is caused to return to its normal upward retracted position thereby raising the traction member when the vehicle maintains a sufficient starting speed. It is further noted that the leaf spring provides a yieldable support for the traction member during traverse of a rough road and offers an inherent shock absorbing characteristic increasing the useful life of the device. The present invention is favorably designed to be lowered during low speed vehicle operation regardless of whether the vehicle transmission is in a low forward or reverse gear. Accordingly, the present traction device offers structural and operative advantages over the prior art as well as an automatic traction member lowering and raising

2 capability which does not require the attention of a vehicle driver.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the present traction device installed in operative association with a vehicle frame.

FIG. 2 is a side elevational view of the present device in the lowered position.

FIG. 3 is a similar view as shown in FIG. 2 with the traction member in a retracted position.

Figure 4:
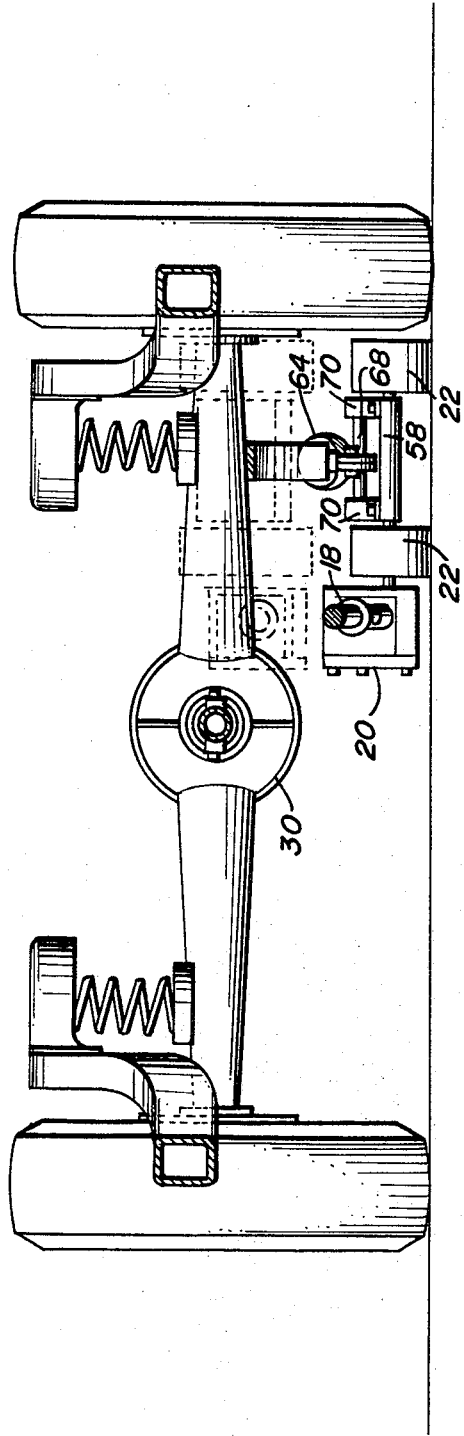
FIG. 4 is a transverse sectional view through a vehicle frame illustrating the traction member in a lowered position.
Figure 5:
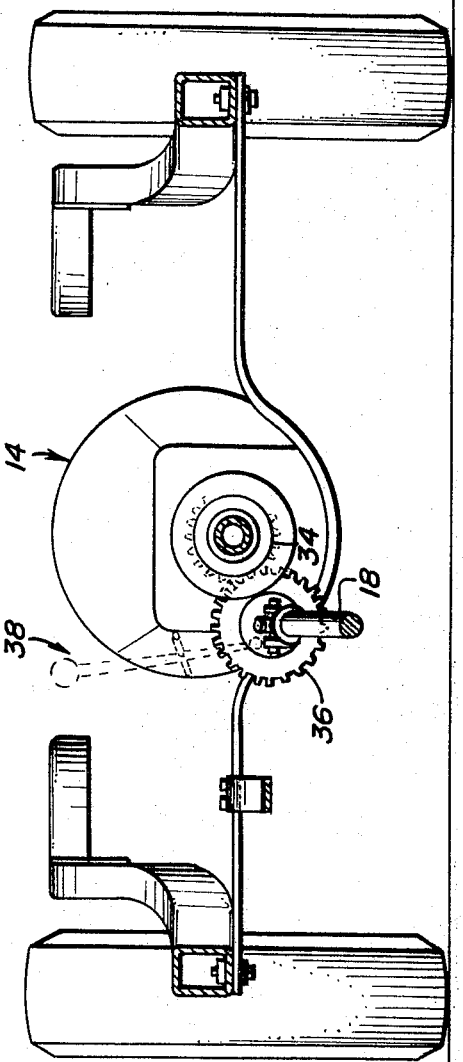
FIG. 5 is a transverse sectional view through a vehicle frame illustrating the engagement between the traction drive mechanism and the transmission of a vehicle.

Referring specifically to the drawings, a preferred embodiment of the present invention is shown in FIGS. 1 and 2 including a traction member 10 disposed below the lower frame of a vehicle as indicated by reference numeral 12. Motive power is initiated by a vehicle transmission 14 through engaging gears 16 as hereinafter explained. A drive shaft 18 then translates rotational motion to second gear means 20 which is connected to two parallel endless traction belts 22. A leaf spring assembly diagrammatically shown as member 24 is connected between the traction member 10 and a portion of the vehicle frame 26 for delivering thrust to the vehicle upon operation of the traction member. The means for causing vertical displacement of the leaf spring 26 and the connected traction member is hereinafter explained. It is noted that a transmission drive shaft 28 of the conventional telescoping type with universal joints therein is connected between the transmission 14 and the rear differential 30 for causing rotation of the wheels 32.

The figures show a conventional power take-off gear 34 associated with an automatic-transmission 14. Attention is directed to FIG. 1 which shows a second rotary gear 36 having an axis of rotation parallel to gear 34 and shiftable for engagement therewith upon actuation of a selectable clutch schematically represented and denoted by reference numeral 38. The second mentioned gear 36 is mounted upon a shaft section 40 disposed parallel with the vehicle main drive shaft 28. One end of shaft section 40 is enclosed within a suitable bearing block 44 mounted upon a cross brace 45 which forms a portion of the vehicle frame. The opposite end of the shaft section 40 is mounted to a universal joint 46 on drive shaft 18. The opposite end of this drive shaft terminates in a second universal joint 48. The outward end of the second universal joint 48 mounts a bevel gear 50, the axis of rotation thereof being coaxial with drive shaft 18. A second bevel gear 52 is disposed perpendicular to the first mentioned gear 50. The bevel gears are enclosed within a suitable gear housing 20. The second bevel gear 52 is mounted coaxially upon the inward end of rotating shaft 54 which in turn mounts coaxially spaced belt wheels 56. An intermediate section of shaft 54 is retained by suitable bearing block means in a platform 58 of the traction member 10 as seen in FIG. 1. A second set of spaced coaxial belt wheels 60 substantially identical to the first mentioned wheels 56 are maintained in coplanar relation with respectively positioned wheels 56 so that two parallel pulley belts 22 may be entrained thereon for rotation about an axis perpendicular to the direction of vehicle travel. The latter mentioned belt wheels 60 are coaxially mounted upon a shaft 59 which is similarly retained within the traction member plaform member 58 as is shaft 54.

The first end of leaf spring 24 is suitably bolted as denoted by reference numeral 62 to a frame cross brace 63. The opposite end of the leaf spring is connected to a ball joint 64, the outward end of said ball joint including a mounting ring 66 fixed thereto. A medial portion of traction member platform 58 includes a shaft 68 disposed parallel with the aforementioned shafts 54 and 59 thereby permitting swivelling of the mounting ring 66 thereon. The outward ends of shaft 68 are retained within suitable bearing blocks 70 secured to platform 58.

Referring once again to FIG. 3, it will be noted that the hydraulic cylinder 72 including a piston member 74 therein is mounted in abutting relation with the upward surface of an intermediate portion of spring leaf 24. The cylinder 72 is suitably mounted to an L-bracket 75 shown in FIG. 1 to be fastened to the vehicle frame 26. FIG. 3 illustrates the retracted non-operative position of piston 74. This figure also shows the disengagement between the driving gears 16 so that no motion is imparted to the traction belts 22. Accordingly, the traction member 10 is retracted to a position close to the underside of the vehicle with the forward end of the traction member 10 being slightly downwardly inclined from the upper end thereof. Automotive transmission of power to the differential 30 operates in the normal manner since the traction member 10 receives no driving power when clutch 38 causes disengagement between gears 34 and 36.

When road conditions are such as to require auxiliary traction, the traction member 10 is lowered from its retracted position as shown in FIG. 2. This is specifically accomplished by a vehicle with an automatic transmission when placed in low gear, either forward or reverse. This transmission condition causes extension of piston 74 from cylinder 72 due to hydraulic pressure conveyed through a line 76 connected at one end thereof to cylinder 72, the opposite end thereof being connected with a conventional automatic transmission pump which causes pumping of fluid above a preselected minimum pressure when the transmission is placed in the aforementioned low gears. An on-off manually operable valve 80 is serially inserted within line 76 so that the hydraulic cylinder 72 does not become actuated when road conditions are satisfactory. The extension of piston 74 causes a downward displacement of leaf spring 24 until engagement between belts 22 and a ground surface is effected. In order to complete operation of the traction device, the driver of the vehicle operates clutch 38 which will cause engagement between gears 34 and 36. This engagement in turn causes transmission of motion therefrom to the pulley belts 22 as aforementioned. Upon rotation of traction belt 22, starting motion will be imparted to the vehicle through the leaf spring 24. Once a sufficient starting speed is developed, the automatic transmission pump 72 decreases the pressure generated therefrom. Thus, the hydraulic cylinder 72 no longer furnishes pressure to maintain piston 74 in the extended position. Accordingly, a piston 74 is retracted into the cylinder thereby causing leaf spring 24 to return to its properly horizontal position as shown in FIG. 3. This upward displacement of leaf spring 24 effectuates retraction of member 10 to a raised position. The vehicle driver operates the clutch 38 so as to disengage gears 34 and 36 causing cessation of belt rotation and complete disengagement between the vehicle transmission and the traction member 10. Accordingly, full vehicle power is available for transmission to the differential and the traction device 10 is maintained disassociated therefrom but prepared for the next utilization thereof as circumstances warrant.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A traction device for a vehicle comprising clutch means, first gear means driven by an external source of power, a drive shaft operatively associated and rotatingly drivable by said first gear means, second gear means driven by said drive shaft, endless traction belt means driven by said second gear means for providing traction to the vehicle upon engagement of said belt means with a ground surface, spring means connected between said belt means and a vehicle frame for normally biasing said belt in a retracted position, and urging means for displacing said spring means and said connected belt means downwardly until said belt means engage a ground surface, said drive shaft being telescoping and including pivotal joints therein for facilitating displacement of said belt means.

2. A traction device for a vehicle comprising clutch means, first gear means driven by an external source of power, a drive shaft operatively associated and rotatingly drivable by said first gear means, second gear means driven by said drive shaft, endless traction belt means driven by said second gear means for providing traction to the vehicle upon engagement of said belt means with a ground surface, spring means connected between said belt means and a vehicle frame for normally biasing said belt in a retracted position, and urging means for displacing said spring means and said connected belt means downwardly until said belt means engage a ground surface, said spring means including a leaf spring and further wherein said urging means includes a piston member mounted on a vehicle frame and positioned to engage an intermediate section of said leaf spring.

3. A road traction device in combination with a vehicle having a transmission, said device comprising clutch means, first gear means selectively driven by said transmission upon actuation of said clutch means, a drive shaft driven by said first gear means, second gear means driven by said shaft, endless traction belt means operated by said second gear means for providing said vehicle with traction upon engagement of said belt means with a ground surface, and means for retracting said belt means upwardly from ground engagement, said drive shaft being telescoping and including universal joints therealong, said device further including a leaf spring connected between said belt means and a vehicle frame for normally biasing said belt means in an upward retracted position and piston means for urging said leaf spring and belt means downwardly for traction engagement with a ground surface, said leaf spring transferring thrust from said belt means to a vehicle upon operation of said belt means.

4. The device set forth in claim 3 wherein said vehicle transmission includes hydraulic pump means and further wherein said piston means is hydraulically actuated by said pump means at a preselected minimum pressure indicative of transmission low gear, said device also having hydraulic conduit means connecting said pump means and said piston means.

5. The device set forth in claim 4 together with valve means connected in said conduit means for selectable closing thereof thereby preventing actuation of said piston means.

6. A tractor device for a vehicle comprising endless traction belt means normally positioned under the vehicle in elevated position above ground, leaf spring means connected between a fixed point on the vehicle and the belt means for biasing the belt means in the elevated position, means for depressing the leaf spring means downwardly for lowering the belt means into traction engagement with the ground, and a drive shaft disposed below the vehicle frame and normally horizontally oriented for driving the belt means, the drive shaft having a telescoping construction and including pivotal joints therein for allowing rotation of the drive shaft in following response to lowering of the belt means.

References Cited

UNITED STATES PATENTS

| | | | |
|---|---|---|---|
| 687,957 | 12/1901 | Fortner | 180—15 |
| 1,296,309 | 3/1919 | Netzel | 180—9.28 |
| 1,337,672 | 4/1920 | Steele | 180—15 |
| 1,443,963 | 2/1923 | Monsen | 180—9.28 |
| 1,908,437 | 5/1933 | Nelson | 180—9.3 X |
| 2,475,250 | 7/1949 | Petersen. | |
| 2,714,933 | 8/1955 | Harris | 180—9.28 |
| 3,285,358 | 11/1966 | Neely | 180—11 |

KENNETH H. BETTS, Primary Examiner

U.S. Cl. X.R.

180—9.28